H. T. STITH.
ANIMAL-TRAP.

No. 182,241. Patented Sept. 12, 1876.

Witnesses:
J. W. Wagner.
J. A. Rutherford.

Inventor:
Henry T. Stith
by Johnson & Johnson
Att'ys.

UNITED STATES PATENT OFFICE.

HENRY T. STITH, OF OTTAWA, KANSAS.

IMPROVEMENT IN ANIMAL-TRAPS.

Specification forming part of Letters Patent No. 182,241, dated September 12, 1876; application filed July 17, 1876.

*To all whom it may concern:*

Be it known that I, HENRY T. STITH, of Ottawa, in the county of Franklin and State of Kansas, have invented certain new and useful Improvements in Animal-Traps, of which the following is a specification:

The nature of my invention fully appears from the following description and accompanying drawings, in which—

Figure 1:
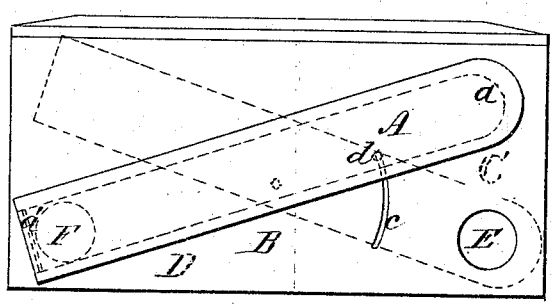
Figure 2:
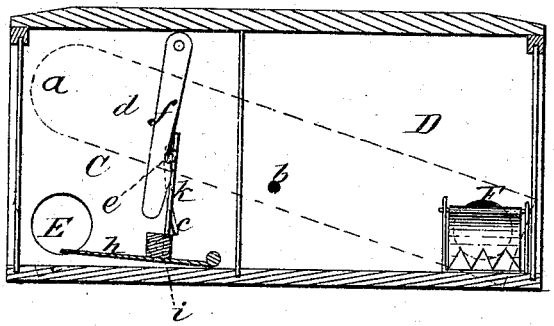
Figure 2:
Figure 3:
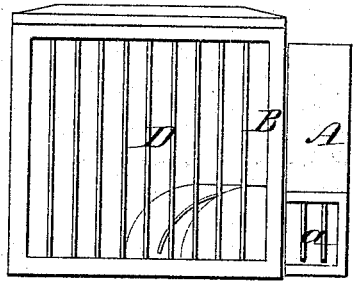
Figure 4:
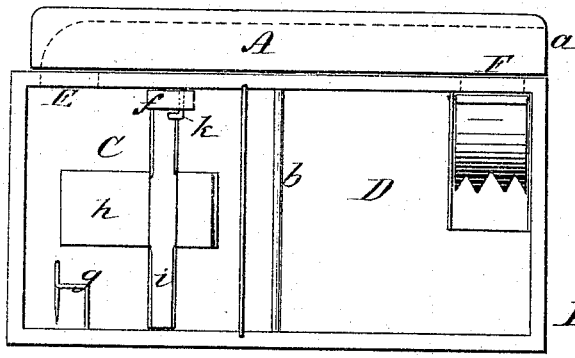

Figure 1 represents a side elevation of the trap set, looking at the entrance-port; Fig. 2, a vertical longitudinal section, looking at the ports from the interior, the trap being set, and the outside transferring-conduit indicated by dotted lines in the position shown in Fig. 1; Fig. 3, an end view, looking at the prison-compartment; and Fig. 4, a top view with the top removed.

A represents a transferring-conduit of three sides, the fourth side being formed by the outer wall B of the trap. Said conduit is closed at one end, $a$, and has a barred window, $a'$, at the other end. It is pivoted upon a pivot-rod, $b$, at such a point that there is a preponderance of weight at the end $a$. The pivot $b$ may have its bearings in both side walls of the trap, or a single short pivot-stem in the wall nearest the conduit may answer. The trap is in two compartments—the bait or entrance compartment C and the prison-compartment D—the transfer from the one to the other being effected by the pivoted conduit. In the side of the compartment C nearest the conduit is a slot, $c$, for the travel of a pin, $d$, projecting from the conduit. This pin $d$ engages with a notch, $e$, in a swinging bar, $f$, hung from the inner side of the trap-wall, for a purpose to be presently described. E is the entrance-port to the compartment C, and F the entrance-port to the prison-compartment D. The latter port, however, does not receive the animal in the first instance, but is closed by the conduit A when the trap is set and during the transfer. In the compartment C I arrange the bait-hook $g$ and the tripping devices, which consist of a tripping platform or treadle, $h$, secured to a rock-rod, $i$, which carries a trigger, $k$, arranged to bear against the notched hanging bar $f$.

When the animal trips the trigger by treading upon the treadle $h$, said bar is thrown back, and the pin $d$ is released from its holding-notch. The conduit then falls by its own weight and covers the entrance-port E, thus preventing the animal's escape from the trap. This it instinctively seeks to do, but in making the attempt it enters the conduit A, and passes up its incline toward the light from the barred window $a'$. Upon crossing the line of the pivot, his weight tilts the conduit, the pin $d$ engages with the notch in the bar $f$, and the trap is reset. The animal has no recourse but to enter the compartment D through the port F. Once in said compartment or prison, his exit is barred by the usual hinged falling door, which, while permitting ingress, prohibits egress.

The operation is repeated, since the trap is set by the animal when he tilts the conduit in passing up its incline in the vain hope of escape. Preferably, only the ends of the trap are barred.

I claim—

1. In an animal-trap having a receiving and a prison compartment, the combination therewith of an outer tilting transferring-conduit, whereby the animal is transferred from the receiving to the prison compartment, and a hinged falling door, whereby its egress is prevented, substantially as described.

2. In an animal-trap having a receiving and a prison compartment and an outer tilting transferring-conduit communicating with said compartments, the combination therewith of the tripping devices, consisting substantially of the platform $h$, the triggered rock-rod $i\ k$, the hanging notched bar $f$, and the pin $d$, substantially as and for the purpose described.

In testimony whereof I have affixed my signature in the presence of two witnesses.

HENRY T. STITH.

Witnesses:
W. J. NEILL, Jr.,
A. B. HARD.